(12) United States Patent
Zheng et al.

(10) Patent No.: US 12,440,074 B2
(45) Date of Patent: Oct. 14, 2025

(54) CLOSESTOOL WITH CLASSIFICATION, COLLECTION AND TREATMENT FUNCTIONS

(71) Applicant: Wenzhou University, Wenzhou (CN)

(72) Inventors: Xiangyong Zheng, Wenzhou (CN); Wencong Zhu, Wenzhou (CN); Min Zhao, Wenzhou (CN); Ping Ma, Wenzhou (CN); Shunfeng Jiang, Wenzhou (CN); Zhiquan Wang, Wenzhou (CN); Huachang Jin, Wenzhou (CN); Suqing Wu, Wenzhou (CN); Zhan Jin, Wenzhou (CN); Ke Bei, Wenzhou (CN); Bentuo Xu, Wenzhou (CN); Hainan Kong, Wenzhou (CN)

(73) Assignee: Wenzhou University, Wenzhou (CN)

( * ) Notice: Subject to any disclaimer, the term of this patent is extended or adjusted under 35 U.S.C. 154(b) by 87 days.

(21) Appl. No.: 18/414,364

(22) Filed: Jan. 16, 2024

(65) Prior Publication Data
US 2025/0160583 A1    May 22, 2025

(30) Foreign Application Priority Data
Nov. 22, 2023   (CN) .......................... 202311565288.2

(51) Int. Cl.
*A47K 11/02*   (2006.01)
*E03D 9/08*   (2006.01)

(52) U.S. Cl.
CPC .............. *A47K 11/023* (2013.01); *E03D 9/08* (2013.01)

(58) Field of Classification Search
CPC ........ A47K 11/023; A47K 11/02; E03D 9/08; E03D 9/00; E03D 9/10; E03D 11/02;
(Continued)

(56) References Cited

U.S. PATENT DOCUMENTS 5,103,772 A * 4/1992 Schmid ................ A01K 1/0121
4/239
9,648,996 B2 * 5/2017 Dreher ................... A47K 11/02
(Continued)

FOREIGN PATENT DOCUMENTS

CH       709004 B1 * 11/2017 ............... E03D 7/00
CN    202324138 U  *  7/2012 ............. A47K 11/02
(Continued)

*Primary Examiner* — Lori L Baker
(74) *Attorney, Agent, or Firm* — CM Law PLLC; Robert C. Klinger (57) ABSTRACT

A closestool with classification, collection and treatment functions includes a closestool body, an anal flushing device, a feces collection and treatment device, a heat recovery box, a urine flushing device, a closestool cover plate, a control panel and a liquid collection device. Through effectively treating feces and urine on the spot, carbonized feces and urine crystals which can realize resource utilization are generated at the same time. Compared with the traditional feces and urine treatment mode of collecting by pipe network and centralized treatment in sewage treatment plants, the treatment cost is reduced, the carbon sequestration of organic waste is realized, the carbon emission is reduced, the phosphorus resources in sewage are recovered, and the water resources are saved by reducing flushing water.

10 Claims, 7 Drawing Sheets

(58) Field of Classification Search
CPC . E03D 11/13; Y02A 50/30; C02F 1/04; C02F 11/10
USPC .................................................. 4/449, 661
See application file for complete search history.

(56) References Cited

U.S. PATENT DOCUMENTS

| | | | |
|---|---|---|---|
| 10,212,915 B1 * | 2/2019 | Brown | A01K 1/0152 |
| 10,273,674 B2 * | 4/2019 | Hall | G01N 33/493 |
| 11,564,666 B2 * | 1/2023 | Hall | A47K 13/24 |
| 11,839,336 B1 * | 12/2023 | Allen | A47K 11/02 |
| 12,144,471 B1 * | 11/2024 | Pickrell | A47K 11/02 |
| 2015/0143626 A1 * | 5/2015 | Dreher | A47K 11/02 4/462 |
| 2019/0208738 A1 * | 7/2019 | Brown | A01K 1/0152 |

FOREIGN PATENT DOCUMENTS

| | | | | |
|---|---|---|---|---|
| CN | 104248386 B | * | 1/2017 | ............. A47K 11/02 |
| CN | 110984327 A | * | 4/2020 | ............. E03D 11/11 |
| CN | 212358508 U | * | 1/2021 | ............. A47K 11/02 |
| CN | 110984327 B | * | 6/2024 | ............. E03D 5/105 |
| EP | 4238467 A1 | * | 9/2023 | ............. A47K 11/02 |
| KR | 20190103130 A | * | 9/2019 | ................ E03D 9/00 |
| KR | 20220140336 A | * | 10/2022 | ............. A47K 11/04 |
| KR | 20240002034 U | * | 12/2024 | ........... E03D 13/005 |
| NL | 1044287 B1 | * | 10/2023 | ........... A47K 13/005 |
| WO | WO-2013100840 A1 | * | 7/2013 | ............. A47K 11/02 |
| WO | WO-2015186148 A1 | * | 12/2015 | ............. A47K 11/105 |
| WO | WO-2023100714 A1 | * | 6/2023 | ........... A01K 23/005 |
| WO | WO-2023191623 A1 | * | 10/2023 | ........... A47K 13/005 |

* cited by examiner

CLOSESTOOL WITH CLASSIFICATION, COLLECTION AND TREATMENT FUNCTIONS

CROSS-REFERENCE TO RELATED APPLICATION

This patent application claims the benefit and priority of Chinese Patent Application No. 2023115652882 filed with the China National Intellectual Property Administration on Nov. 22, 2023, the disclosure of which is incorporated by reference herein in its entirety as part of the present application.

TECHNICAL FIELD

The present disclosure relates to the technical field of closestools, in particular to a closestool with classification, collection and treatment functions.

BACKGROUND

At present, in towns and cities around the world, the mode of flushing in closestool, collecting by pipe network, and centralized treatment in sewage treatment plants is basically used to treat human feces, urine and other wastes. This mode has problems such as water resource waste, high construction cost of sewage pipe network, easy damage and leakage of sewage pipe network, difficulty in treatment of residual sludge, and difficulty in resource recovery and utilization of nitrogen and phosphorus in urine and feces, and the problems need to be solved urgently.

About 97% of total nitrogen, 90% of total phosphorus, and 60% of COD (Chemical Oxygen Demand) in domestic sewage come from feces and urine, and the volume of feces and urine only accounts for about 1% of the volume of domestic sewage. Therefore, it is easier to achieve the purposes of reducing treatment cost and recovering resources by separating the high-concentration and low-volume feces and urine from closestool water, and treating them separately, which has become one of the research hot spots in domestic sewage treatment.

For the in-situ treatment of feces and urine separated from the source, the existing common technologies include dry collection, storage and regular cleaning of feces, dry collection and composting of feces for biodegradation, evaporation and crystallization of urine after acidification and stabilization or nitrification, biological treatment of black water (feces, urine and anal cleaning water) from water flushing closestools, fecal incineration closestools, bio-electrochemical treatment and reuse of black water from water flushing closestools, membrane bioreactor treatment and reuse of black water from water flushing closestools, nitrogen protection pyrolysis of feces, and the like. However, the existing treatment technologies of feces and urine still have problems such as insufficient degree in resource recovery and utilization and instability in process, and need to be further improved.

SUMMARY

The purpose of the present disclosure is to provide a closestool with classification, collection and treatment functions so as to solve the problems in the prior art and realize low-cost resource recovery and utilization of feces and urine.

In order to achieve the purpose, the present disclosure provides the following solutions.

The present disclosure provides a closestool with classification, collection and treatment functions, including:

a closestool body;

an anal flushing device arranged inside the closestool body, a retractable water spray pipe is provided as the anal flushing device;

a feces collection and treatment device, the feces collection and treatment device includes a first storage box, a combined box and a second storage box, the first storage box is fixedly connected with a side of the combined box, and the second storage box is fixedly connected with another side of the combined box; the combined box includes a lifting mechanism, a collection container, a feces pushing mechanism, a media pushing mechanism, a pyrolysis furnace, and a transfer box arranged above the pyrolysis furnace, the transfer box is located directly below a feces outlet of the closestool body, a top plate of the pyrolysis furnace is provided as a base plate of the transfer box, the top plate of the pyrolysis furnace and a top plate of the transfer box are both capable of opening and closing, and the lifting mechanism is configured for driving the collection container to lift and lower in the pyrolysis furnace and the transfer box; the feces pushing mechanism includes a first electric push rod and a first push plate, the first electric push rod is fixedly connected with an inner wall of the transfer box, a passage port is arranged between the transfer box and the second storage box, and the first electric push rod is configured for driving the first push rod to be in sliding fit with an inner wall of the collection container to push feces in the collection container into the second storage box through the passage port; the first storage box is configured for storing solid heat media, a feeding port is formed in a top of the first storage box, a feeding door is arranged at a bottom of the first storage box, the feeding door is located between the first storage box and the pyrolysis furnace, and a first motor is configured for controlling opening and closing of the feeding door; the media pushing mechanism includes a second electric push rod and a second push plate, the second electric push rod is fixedly connected with the inner wall of the transfer box, and the second electric push rod is configured for driving the second push plate to be in sliding fit with an inner wall of the pyrolysis furnace to push the solid heat media in the pyrolysis furnace into the first storage box through the feeding door;

a heat recovery box, a top end of the heat recovery box is fixedly connected with a bottom end of the pyrolysis furnace, and a base plate of the pyrolysis furnace is provided as a top plate of the heat recovery box;

a urine flushing device, the urine flushing device includes a flushing pipe arranged at an upper side edge of an inner wall of the closestool body;

a closestool cover plate, the closestool cover plate is installed on a top of the closestool body; and a control panel, an accommodating chamber corresponding to the control panel is formed in the closestool cover plate, the control panel is in sliding fit with the accommodating chamber, and switches for starting and stopping the lifting mechanism, the first electric push rod, the second electric push rod, the first motor, the water spray pipe, and the flushing pipe and a controller are arranged in the control panel.

Preferably, an arc-shaped screen is provided as the collection container, and an axis of the arc-shaped screen is horizontal and parallel to an axis of the first push plate. The arc-shaped screen is coaxial with the first push plate and has an upward concave surface, and a diameter of meshes of the arc-shaped screen is 0.5 cm-1.0 cm.

Preferably, the solid heat media include one or more of sand, kaolin, quartz sand, stone powder, yellow soil, and red soil, and a particle size of the sand is less than 0.5 cm.

Preferably, a heating element is arranged on an inner side wall of the base plate of the pyrolysis furnace. The base plate of the pyrolysis furnace is made of stainless steel. A removable insulation layer is further arranged below the base plate of the pyrolysis furnace. The removable insulation layer is attached to an outer side wall of the base plate of the pyrolysis furnace when installed. The removable insulation layer is partially immersed in liquid heat media in the heat recovery box when removed. The liquid heat media include one or more of water, ethylene glycol, and heat conduction oil.

Preferably, the closestool further includes a liquid collection device. The liquid collection device includes a baffle plate, a urine collection pipe, a urine evaporation box, and an anal cleaning water discharge pipe.

The baffle plate is arranged in the closestool body and divides a pool of the closestool body into a urine pool and a feces pool. A urine collection chamber adjacent to the urine pool and an anal cleaning water collection chamber adjacent to the feces pool are formed in the baffle plate. The urine collection chamber is in communication with a bottom of the urine pool through several first liquid inlet holes formed in the baffle plate. The anal cleaning water collection chamber is in communication with a bottom of the feces pool through several second liquid inlet holes formed in the baffle plate.

An evaporation drying agent and a dehumidifier are arranged inside the urine evaporation box. Water-absorbing resin is provided as the evaporation drying agent. The dehumidifier is configured for dehumidifying gas inside the urine evaporation box. A condensed water outlet of the dehumidifier is in communication with a municipal sewage pipe network. A liquid outlet at a bottom of the urine collection chamber is in communication with the urine evaporation box through the urine collection pipe. A liquid outlet at a bottom of the anal cleaning water collection chamber is in communication with the municipal sewage pipe network through the anal cleaning water discharge pipe.

Preferably, circumferential outer side walls of the urine evaporation box, circumferential outer side walls of the heat recovery box, side walls of the transfer box, the top plate of the transfer box, the top plate of the pyrolysis furnace, side walls of the pyrolysis furnace, side walls of the first storage box, side walls of the second storage box and the feeding door are all made of heat insulation boards.

Preferably, the heat insulation boards each include two stainless steel plates and a polyurethane foam plastic layer sandwiched between the two stainless steel plates.

Preferably, the lifting mechanism includes a second motor and multiple sliding rods parallel to each other. The sliding rods are vertically arranged and fixedly connected with the inner wall of the transfer box. The collection container is slidably sleeved on all the sliding rods. A linear motor is provided as the second motor. The second motor is fixedly connected with the inner wall of the transfer box. An output end of the second motor is fixedly connected with the collection container.

Preferably, a media feeding mechanism is arranged inside the first storage box. The media feeding mechanism includes a third electric push rod and a third push plate. The third electric push rod is fixedly connected with a top end of the first storage box. The third electric push rod is configured for driving the third push plate to be in sliding fit with an inner wall of the first storage box to push the solid heat media in the first storage box into the pyrolysis furnace through the feeding door.

Preferably, the closestool further includes an exhaust pipe. The urine evaporation box, the transfer box and the pyrolysis furnace are all in communication with a first end of the exhaust pipe. A second end of the exhaust pipe is arranged outdoors, and the second end of the exhaust pipe is configured for exhausting.

Compared with the prior art, the present disclosure achieves the following technical effects.

According to the closestool with classification, collection and treatment functions provided in the present disclosure, feces and urine are effectively treated on site. Furthermore, carbonized feces and urine crystals which can realize resource utilization are produced. Compared with the traditional feces and urine treatment mode of collecting by pipe network and centralized treatment in sewage treatment plants, the treatment cost is reduced, the carbon sequestration of organic waste is realized, the carbon emission is reduced, the phosphorus resources in sewage are recovered, and the water resources are saved by reducing flushing water.

BRIEF DESCRIPTION OF THE DRAWINGS

To describe the technical solutions in the embodiments of the present disclosure or in the prior art more clearly, the following briefly introduces the attached figures required for describing the embodiments. Apparently, the attached figures in the following description show merely some embodiments of the present disclosure, and those skilled in the art may still obtain other figures from these attached figures without creative efforts.

Reference signs: 1 exhaust pipe; 2 control panel; 3 closestool body; 4 anal flushing device; 5 feces collection and treatment device; 6 heat recovery device; 7 dehumidifier; 8 urine evaporation box; 9 closestool cover plate; 10 urine flushing device; 11 urine collection pipe; 12 anal cleaning water discharge pipe; 13 first check valve; 14 second check valve; 15 baffle plate; 16 urine collection chamber; 17 anal cleaning water collection chamber; 18 first liquid inlet hole; 19 second liquid inlet hole; 20 feces outlet; 21 condensed water outlet; 22 liquid outlet at bottom of the urine collection chamber; 23 liquid outlet at bottom of anal cleaning water collection chamber; 2-1 controller; 2-2 switch; 3-1 urine pool; 3-2 feces pool; 4-1 water spray pipe; 5-1 third push plate; 5-2 solid heat media; 5-3 first storage box; 5-4 feeding door; 5-5 pyrolysis furnace; 5-6 top plate of pyrolysis furnace; 5-7 base plate of pyrolysis furnace; 5-8 second push plate; 5-9 collection container; 5-10 second storage box; 5-11 transfer box; 5-12 first push plate; 5-13 combined box; 5-14 lifting mechanism; 5-15 feces pushing mechanism; 5-16 media pushing mechanism; 5-17 top plate of transfer box; 5-18 first electric push rod; 5-19 passage port; 5-20 feeding port; 5-21 first motor; 5-22 second electric push rod; 5-23 heating element; 5-24 second motor; 5-25 sliding rod; 5-26 output end of second motor; 5-27 media feeding mechanism; 5-28 third electric push rod; 9-1 accommodating chamber; 10-1 flushing pipe.

DETAILED DESCRIPTION OF THE EMBODIMENTS

The following clearly and completely describes the technical solutions in the embodiments of the present disclosure with reference to the attached figures of embodiments of the present disclosure. Apparently, the described embodiments are merely a part rather than all of the embodiments of the present disclosure. Based on the embodiments in the present disclosure, all other embodiments obtained by those skilled in the art without creative efforts fall within the scope protected by the present disclosure.

The purpose of the present disclosure is to provide a closestool with classification, collection and treatment functions so as to solve the problems in the prior art and realize low-cost resource recovery and utilization of feces and urine.

To make the foregoing purpose, features and advantages of the present disclosure clearer and easier to understand, the present disclosure is further described in detail below with reference to the attached figures and specific embodiments.

As shown in FIG. 1 to FIG. 8, this embodiment of the present disclosure provides a closestool with classification, collection and treatment functions. The closestool includes a closestool body 3, an anal flushing device 4, a feces collection and treatment device 5, a heat recovery box, a urine flushing device 10, a closestool cover plate 9, a control panel 2, and a liquid collection device.

Figure 1:
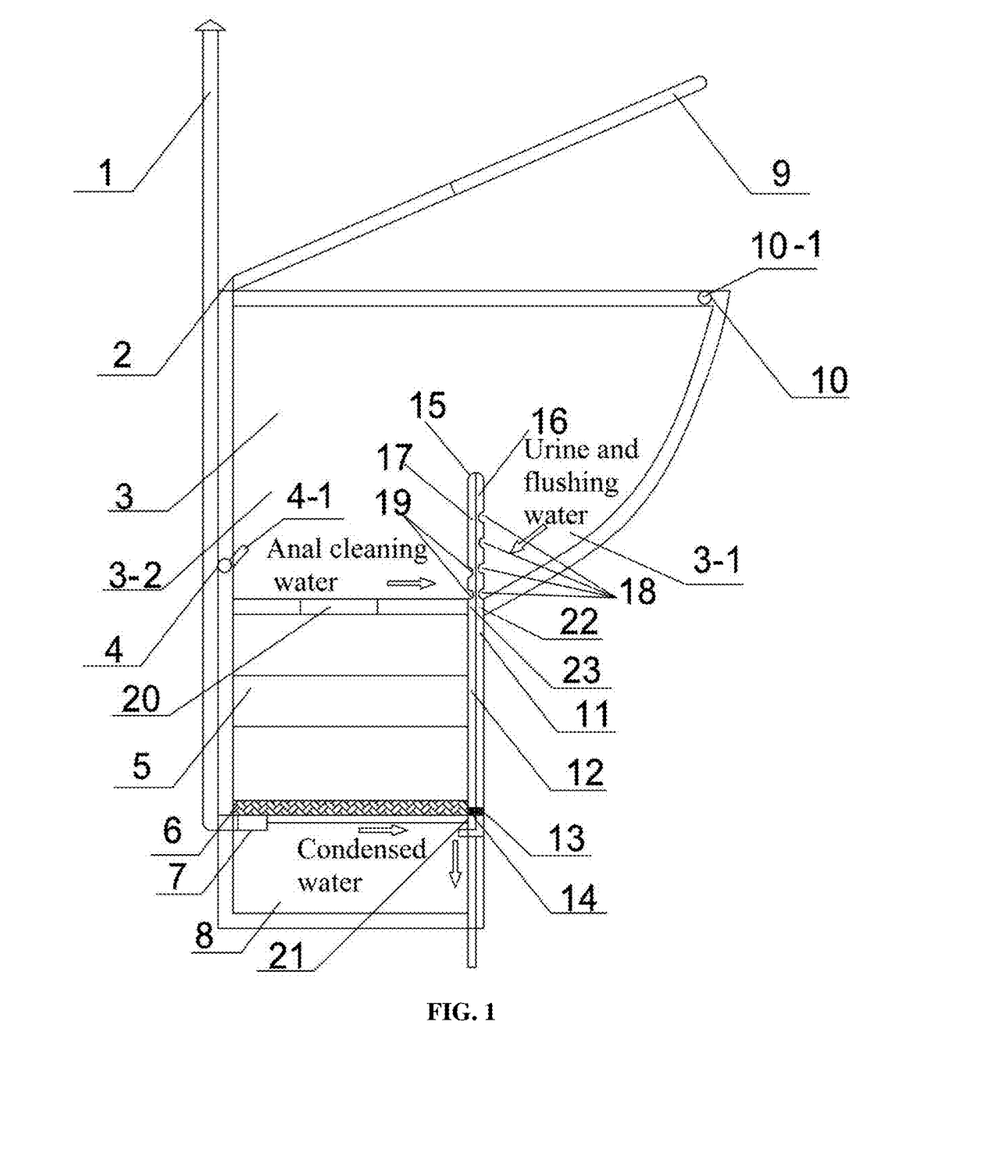
FIG. 1 is a structural schematic diagram of a closestool with classification, collection and treatment functions according to an embodiment of the present disclosure.

The anal flushing device 4 is arranged inside the closestool body 3, and a retractable water spray pipe 4-1 for cleaning anal opening of a user after defecation is provided as the anal flushing device 4. The urine flushing device 10 includes a flushing pipe 10-1 arranged at an upper side edge of an inner wall of the closestool body 3 for flushing discharged urine.

Figure 2:
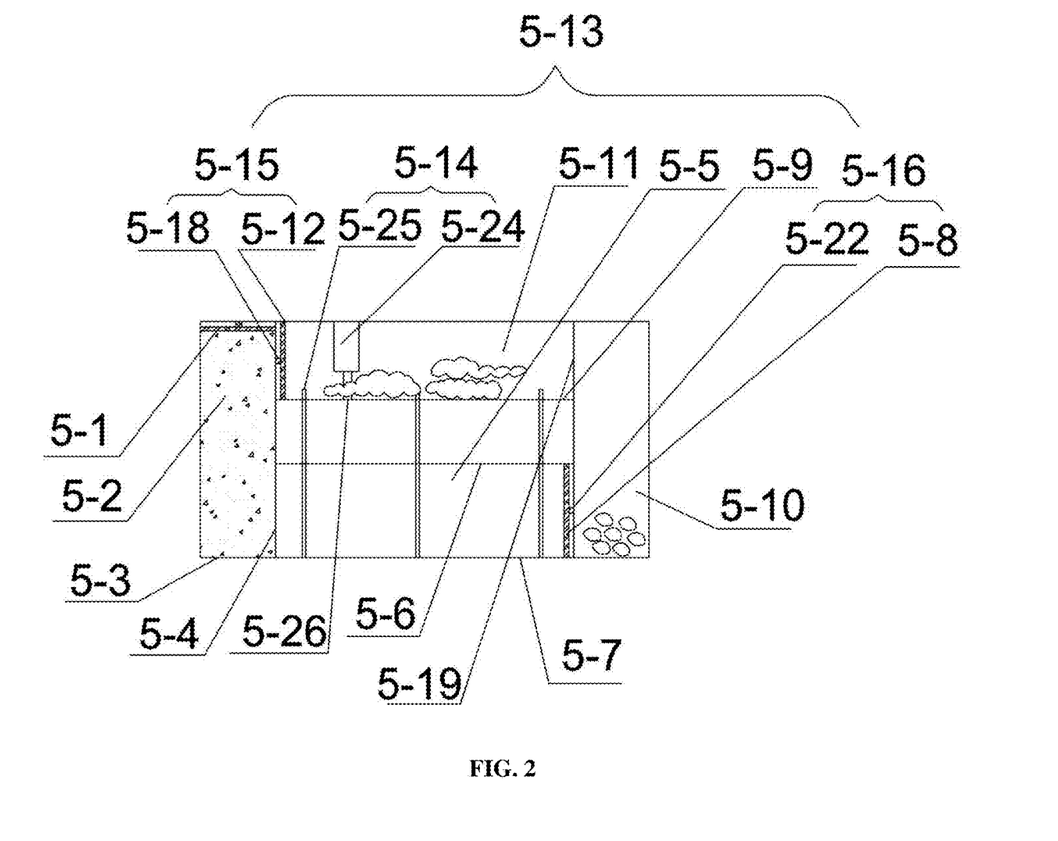
FIG. 2 is a schematic diagram of a feces collection and treatment device in a closestool with classification, collection and treatment functions in a first working stage according to an embodiment of the present disclosure.
Figure 3:
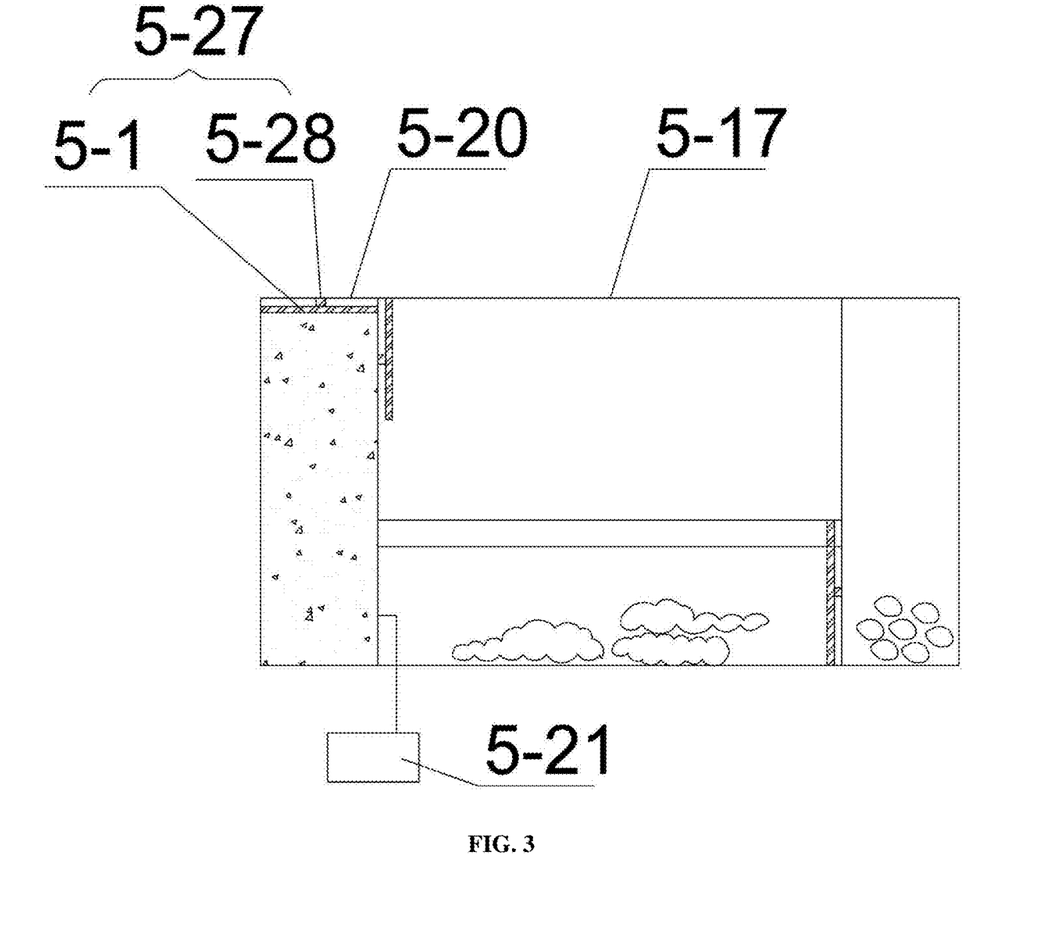
FIG. 3 is a schematic diagram of a feces collection and treatment device in a closestool with classification, collection and treatment functions in a second working stage according to an embodiment of the present disclosure.
Figure 4:
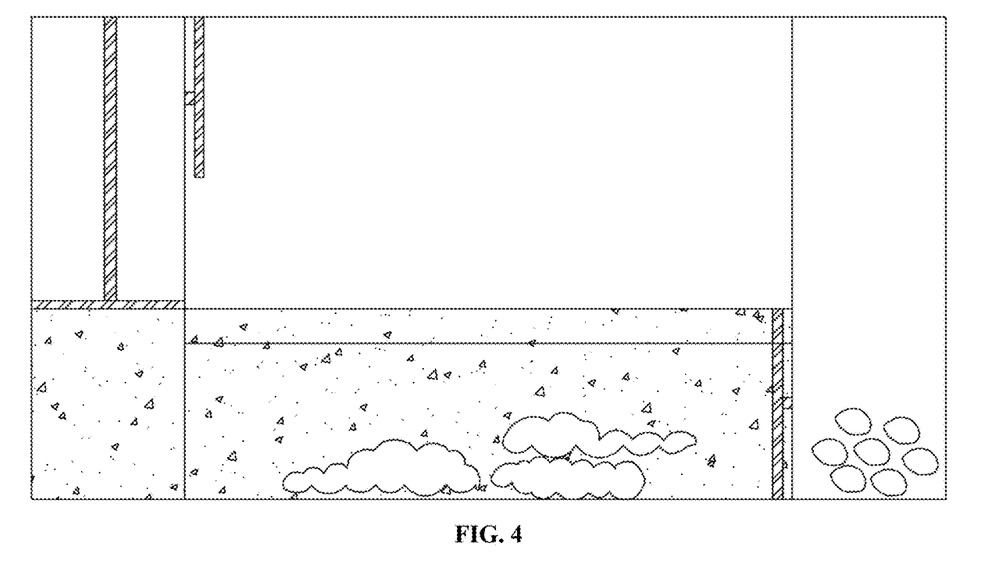
FIG. 4 is a schematic diagram of a feces collection and treatment device in a closestool with classification, collection and treatment functions in a third working stage according to an embodiment of the present disclosure.
Figure 5:
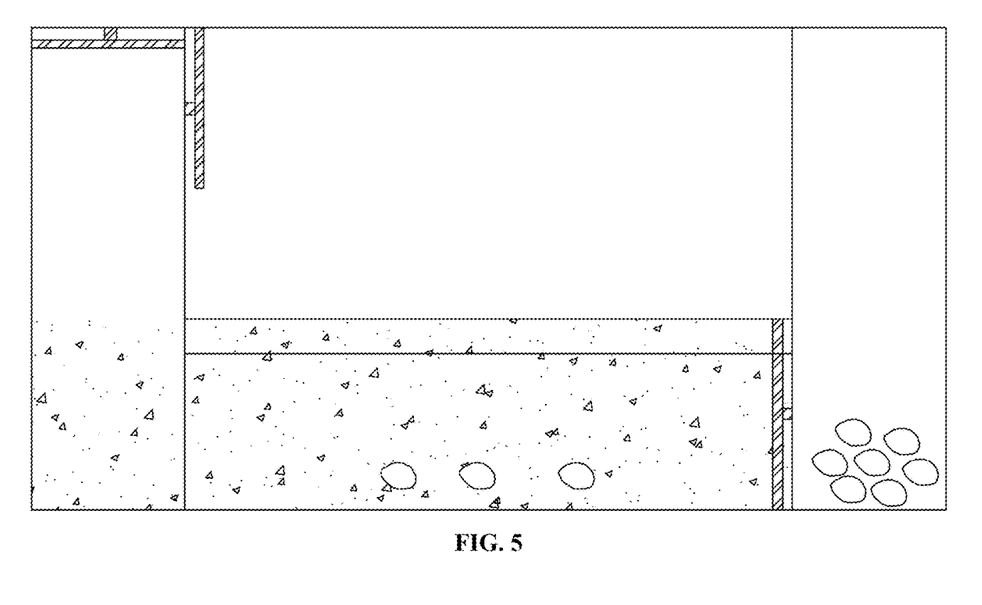
FIG. 5 is a schematic diagram of a feces collection and treatment device in a closestool with classification, collection and treatment functions in a fourth working stage according to an embodiment of the present disclosure.
Figure 6:
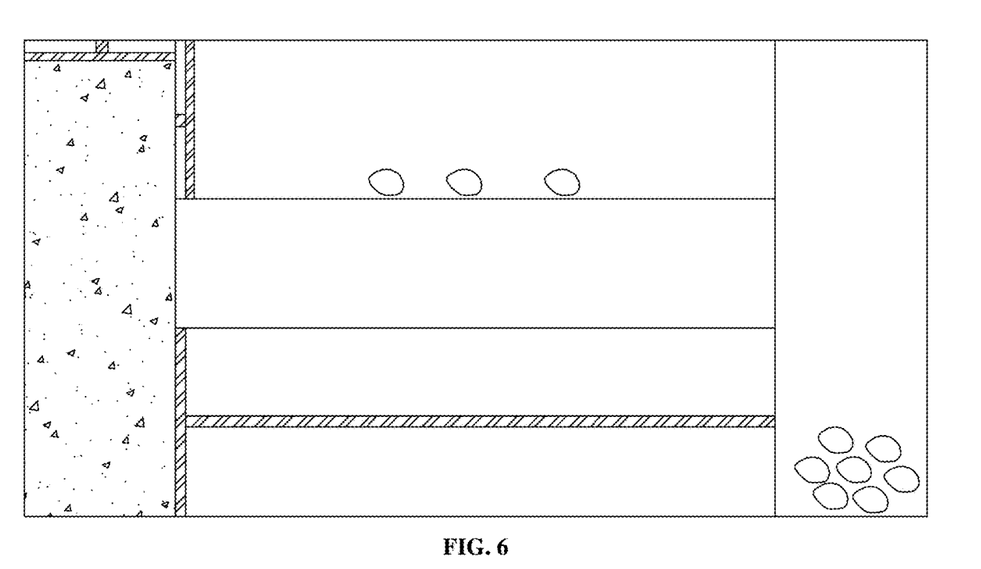
FIG. 6 is a schematic diagram of a feces collection and treatment device in a closestool with classification, collection and treatment functions in a fifth working stage according to an embodiment of the present disclosure.
Figure 7:
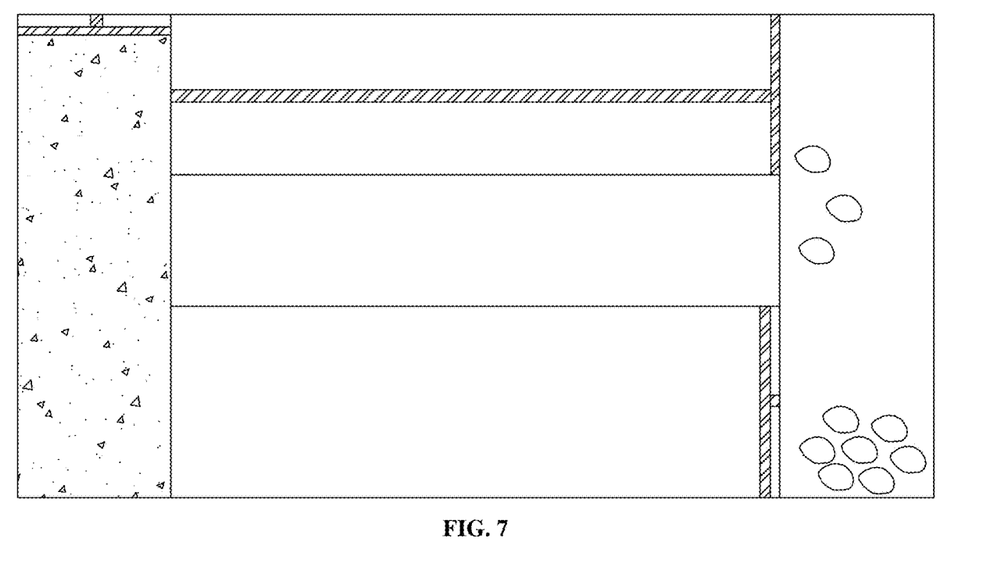
FIG. 7 is a schematic diagram of a feces collection and treatment device in a closestool with classification, collection and treatment functions in a sixth working stage according to an embodiment of the present disclosure.
Figure 8:
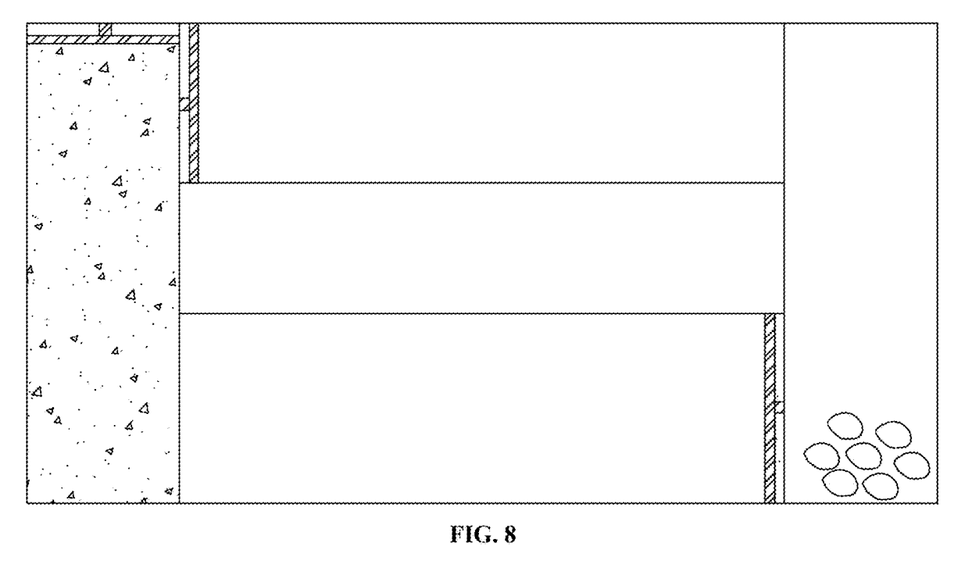
FIG. 8 is a schematic diagram of a feces collection and treatment device in a closestool with classification, collection and treatment functions in a seventh working stage according to an embodiment of the present disclosure.

Referring to FIG. 2, the feces collection and treatment device 5 includes a first storage box 5-3, a combined box 5-13 and a second storage box 5-10. The first storage box 5-3 is fixedly connected with a side of the combined box 5-13, and the second storage box 5-10 is fixedly connected with another side of the combined box 5-13. The combined box 5-13 includes a lifting mechanism 5-14, a collection container 5-9, a feces pushing mechanism 5-15, a media pushing mechanism 5-16, a pyrolysis furnace 5-5, and a transfer box 5-11 arranged above the pyrolysis furnace 5-5. The transfer box 5-11 is located directly below a feces outlet 20 of the closestool body 3.

The first storage box 5-3 is configured for storing solid heat media 5-2. A feeding port 5-20 is formed in a top of the first storage box 5-3. A feeding door 5-4 is arranged at a bottom of the first storage box 5-3. The feeding door 5-4 is located between the first storage box 5-3 and the pyrolysis furnace 5-5. A first motor 5-21 is configured for controlling opening and closing of the feeding door 5-4. A media feeding mechanism 5-27 is arranged inside the first storage box 5-3. The media feeding mechanism 5-27 includes a third electric push rod 5-28 and a third push plate 5-1. The third electric push rod 5-28 is fixedly connected with a top end of the first storage box 5-3. The third electric push rod 5-28 is configured for driving the third push plate 5-1 to be in sliding fit with an inner wall of the first storage box 5-3 to push the solid heat media 5-2 in the first storage box 5-3 into the pyrolysis furnace 5-5 through the feeding door 5-4.

The solid heat media 5-2 include one or more of sand, kaolin, quartz sand, stone powder, yellow soil and red soil, and a particle size of the solid heat media 5-2 is less than 0.5 cm.

A top plate 5-17 of the transfer box 5-11 can be divided in two halves and opened along a central axis thereof. When the top plate 5-17 of the transfer box 5-11 is opened, an opening with a length and width of 15 cm×15 cm can be formed in a central position of a top end of the pyrolysis furnace 5-5. When the user is sitting on the closestool, feces can just fall through the opening. A top plate 5-6 of the pyrolysis furnace is provided as a base plate of the transfer box 5-11, and the top plate 5-6 of the pyrolysis furnace can be completely opened upwards from four sides or completely closed to facilitate passage of the collection container 5-9.

The lifting mechanism 5-14 is configured for driving the collection container 5-9 to lift and lower in the pyrolysis furnace 5-5 and the transfer box 5-11. The collection container 5-9 plays a role in collecting feces discharged when the user is sitting on the closestool, and the collection container 5-9 can entirely enter the pyrolysis furnace 5-5 to pyrolysis the collected feces. In this embodiment, an arc-shaped screen is provided as the collection container 5-9. An axis of the arc-shaped screen is horizontal and parallel to an axis of the first push plate 5-12. The arc-shaped screen can be coaxial with the first push plate 5-12 and has an upward concave surface. A diameter of meshes of the arc-shaped screen is 0.5 cm-1.0 cm.

In this embodiment, the lifting mechanism 5-14 includes a second motor 5-24 and multiple sliding rods 5-25 parallel to each other. The sliding rods 5-25 are vertically arranged and fixedly connected with an inner wall of the transfer box 5-11. The collection container 5-9 is slidably sleeved on all the sliding rods 5-25. A linear motor is provided as the second motor 5-24. The second motor 5-24 is fixedly connected with the inner wall of the transfer box 5-11. An output end 5-26 of the second motor 5-24 is fixedly connected with the collection container 5-9.

The media pushing mechanism 5-16 is arranged inside the pyrolysis furnace 5-5. In particular, the media pushing mechanism 5-16 includes a second electric push rod 5-22 and a second push plate 5-8. The second electric push rod 5-22 is fixedly connected with the inner wall of the transfer box 5-11. The second electric push rod 5-22 is configured for driving the second push plate 5-8 to be in sliding fit with an inner wall of the pyrolysis furnace 5-5 to push the solid heat media in the pyrolysis furnace 5-5 into the first storage box 5-3 through the feeding door 5-4.

The feces pushing mechanism 5-15 is arranged inside the transfer box 5-11. In particular, the feces pushing mechanism 5-15 includes a first electric push rod 5-18 and a first push plate 5-12. The first electric push rod 5-18 is fixedly connected with an inner wall of the transfer box 5-11. A passage port 5-19 is arranged between the transfer box 5-11 and the second storage box 5-10. The first electric push rod 5-18 is configured for driving the first push rod 5-12 to be in sliding fit with an inner wall of the collection container 5-9 to push carbonized feces in the collection container 5-9 into the second storage box 5-10 through the passage port 5-19.

Figure 10:
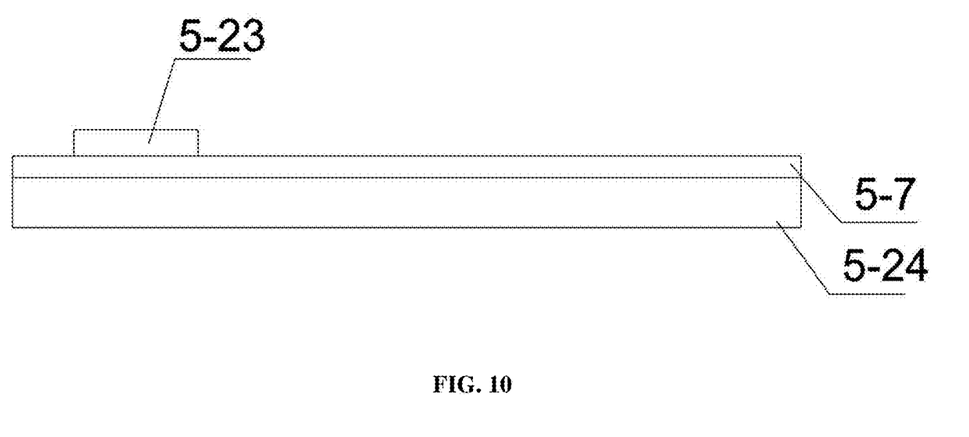
FIG. 10 is a schematic diagram of the bottom plate of the pyrolysis furnace.

A top end of the heat recovery box is fixedly connected with a bottom end of the pyrolysis furnace 5-5, and a base plate 5-7 of the pyrolysis furnace is provided as a top plate of the heat recovery box. In this embodiment, a heating element 5-23 is arranged on an inner side wall of the base plate 5-7 of the pyrolysis furnace, and the heating element 5-23 is used for providing heat for pyrolysis of the feces. The base plate 5-7 of the pyrolysis furnace is made of stainless steel. A removable insulation layer is further arranged below the base plate 5-7 of the pyrolysis furnace. The removable insulation layer is attached to an outer side wall of the base plate 5-7 of the pyrolysis furnace when installed, and the removable insulation layer is partially immersed in liquid heat media in the heat recovery box when removed, so that heat in the pyrolysis furnace 5-5 is quickly conducted into the heat recovery box for recovery and utilization. The liquid heat media include one or more of water, ethylene glycol, and heat conduction oil.

The liquid collection device includes a baffle plate 15, a urine collection pipe 11, a urine evaporation box 8 and an anal cleaning water discharge pipe 12.

The baffle plate 15 is arranged in the closestool body 3 and divides a pool of the closestool body 3 into a urine pool 3-1 and a feces pool 3-2. A urine collection chamber 16 adjacent to the urine pool 3-1 and an anal cleaning water collection chamber 17 adjacent to the feces pool 3-2 are formed in the baffle plate 15. The urine collection chamber 16 is in communication with a bottom of the urine pool 3-1 through multiple first liquid inlet holes 18 formed in the baffle plate 15. The anal cleaning water collection chamber 17 is in communication with a bottom of the feces pool 3-2 through multiple second liquid inlet holes 19 formed in the baffle plate 15.

An evaporation drying agent and a dehumidifier 7 are arranged inside the urine evaporation box 8. Water-absorbing resin is provided as the evaporation drying agent. The dehumidifier 7 is configured for dehumidifying gas inside the urine evaporation box 8. A condensed water outlet 21 of the dehumidifier 7 is in communication with a municipal sewage pipe network. A liquid outlet 22 at a bottom of the urine collection chamber 16 is in communication with the urine evaporation box 8 through the urine collection pipe 11.

A liquid outlet 23 at a bottom of the anal cleaning water collection chamber 17 is in communication with the municipal sewage pipe network through the anal cleaning water discharge pipe 12.

The urine evaporation box 8 is arranged below a heat recovery device 6. A base plate of the heat recovery device 6 is provided as a top plate of the urine evaporation box 8. The passage port 5-19 that can be opened and closed is arranged on the box body of the urine evaporation box 8. The passage port 5-19 is used for adding the evaporation drying agent into the urine evaporation box 8 and cleaning recycling products in the urine evaporation box 8. Heat in the pyrolysis furnace 5-5 is conducted to the liquid heat media in the heat recovery device 6 through the base plate 5-7 of the pyrolysis furnace and the removable insulation layer, and heat conduction efficiency between the pyrolysis furnace 5-5 and the heat recovery device 6 can be increased by the base plate 5-7 of the pyrolysis furnace made of single-layer stainless steel. The liquid heat media dissipate the heat into the urine evaporation box 8 through the base plate of the heat recovery device 6 to increase the evaporation efficiency of urine in the urine evaporation box 8.

A first check valve 13 is arranged on the urine collection pipe 11. A second check valve 14 is arranged on the anal cleaning water discharge pipe 12. The first check valve 13 and the second check valve 14 are configured for preventing odor from backflowing into the closestool body 3 and indoors.

The closestool with classification, collection and treatment functions in the embodiment further includes an exhaust pipe 1. The urine evaporation box 8, the transfer box 5-11 and the pyrolysis furnace 5-5 are all in communication with a first end of the exhaust pipe 1. The exhaust pipe 1 passes through a piping shaft in a rest room. A second end of the exhaust pipe 1 is arranged outdoors (such as on the roof), and the second end of the exhaust pipe 1 is configured for exhausting. The odor in the liquid evaporation box, the transfer box 5-11 and the pyrolysis furnace 5-5 is discharged through the exhaust pipe 1. The exhaust pipe 1 in particular can be a DN50 pipe made of PVC (Polyvinyl chloride).

Figure 9:
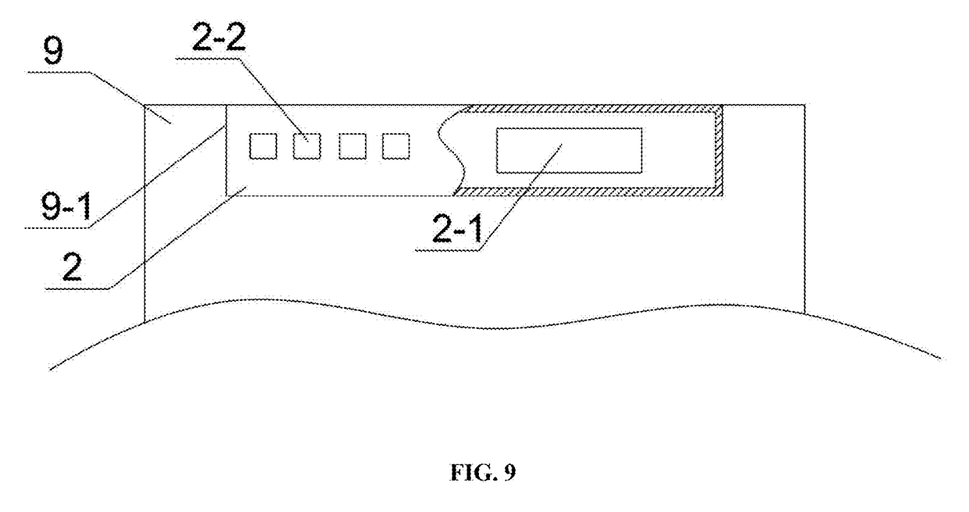
FIG. 9 is a partial schematic diagram of the closestool cover plate and control panel.

The closestool cover plate 9 is installed on a top of the closestool body 3. The closestool cover plate 9 is made of plastics, with a length, width, and thickness of 70 cm×35 cm×1.5 cm. An accommodating chamber 9-1 corresponding to the control panel 2 is formed in the closestool cover plate 9. The control panel 2 is in sliding fit with the accommodating chamber 9-1. A controller 2-1 and switches 2-2 for start and stop of various components, including the lifting mechanism 5-14, the first electric push rod 5-18, the second electric push rod 5-22, the first motor 5-21, the water spray pipe 4-1 and the flushing pipe 10-1, are arranged in the control panel 2.

In addition, it should be noted that, the retractable water spray pipe 4-1 that provided as the anal flushing device 4, the top plate that can be divided in two halves and opened along the central axis thereof on the transfer box 5-11, the top plate that can be completely opened upwards from four sides or completely closed on the pyrolysis furnace 5-5 (namely, the top plate 5-6 of the pyrolysis furnace), and the removable insulation layer at the bottom of the pyrolysis furnace 5-5 can be directly purchased from the market or realized by those skilled in the art based on the contents described in the present disclosure. In addition, the retractable water spray pipe 4-1 that provided as the anal flushing device 4, the top plate that can be divided in two halves and opened along the central axis thereof on the transfer box 5-11, the top plate of the pyrolysis furnace 5-5 that can be completely opened upwards from four sides or completely closed, and the removable insulation layer at the bottom of the pyrolysis furnace 5-5 can all be electrically controlled and connected with the controller 2-1 through signals, respectively. The retractable water spray pipe 4-1 that provided as the anal flushing device 4, the top plate that can be divided in two halves and opened along the central axis thereof on the transfer box 5-11, the top plate of the pyrolysis furnace 5-5 that can be completely opened upwards from four sides or completely closed, and the removable insulation layer at the bottom of the pyrolysis furnace 5-5 can be controlled to perform corresponding actions by sending commands to the controller 2-1 through the control panel 2.

In this embodiment, a touch screen made of liquid crystals is provided as the control panel 2. The control panel 2 is connected with the controller 2-1 through signal. A preset program is arranged inside the controller 2-1. The preset program can automatically control the operation of the anal flushing device, fecal collection and treatment device 5, the heat recovery device 6, the dehumidifier 7, the urine evaporation box 8, the urine flushing device 10, and other components. In addition, four working control buttons, that is, a fecal treatment preparation button, a fecal treatment start, an anal cleaning start button, and a urine treatment start button, are arranged on the control panel 2, and the four working control buttons can be connected with a mobile phone by wireless communication and can be operated directly through applications on the mobile phone without drawing out the control panel 2.

It should be noted that the fecal treatment preparation, the fecal treatment start, the anal cleaning start, the urine treatment start, and other functions depend on the preset programs in the controller 2-1 in advance, and the preset programs are programs that can be written by those skilled in the art based on the contents described in the present disclosure in combination with existing computer programming knowledge, and the preset programs will not described in detail in this embodiment.

In addition, it is worth noting that circumferential outer side walls of the urine evaporation box 8, circumferential outer side walls of the heat recovery box, side walls of the transfer box 5-11, the top plate 5-17 of the transfer box 5-11, the top plate 5-6 of the pyrolysis furnace, side walls of the pyrolysis furnace 5-5, side walls of the first storage box 5-3, side walls of the second storage box 5-10, and the feeding door 5-4 are all made of heat insulation boards. The heat insulation boards can play a role of heat insulation to avoid waste caused by heat loss.

In an optional solution of the embodiment, preferably, the heat insulation boards each include two stainless steel plates and a polyurethane foam plastic layer sandwiched between the two stainless steel plates.

The specific working principle of the closestool with classification, collection and treatment functions in the embodiment is as follows.

When the user is sitting on the closestool, the top plate 5-17 of the transfer box is opened through the control panel, the feces excreted by the user fall onto the collection container through the opening in the top plate 5-17 of the transfer box 5-11 (as shown in FIG. 2). When the user finishes defecation, the collection container 5-9 is lowered to the bottom of the pyrolysis furnace 5-5 (referring to FIG. 3) by pressing the feces treatment start button on the control panel 2, the top plate 5-17 of the transfer box 5-11 and the top plate 5-6 of the pyrolysis furnace are both closed, and then the feeding door 5-4 is opened. The solid heat media 5-2 stored in the solid heat media storage box are pushed into the pyrolysis furnace 5-5 under the combined action of gravity and the thrust of the push rod of the solid heat media storage box (referring to FIG. 4), and then the feeding door 5-4 is closed. The push rod of the solid heat media storage box is retracted to its original position, and the heating element 5-23 placed on a bottom surface of the pyrolysis furnace 5-5 starts heating. After heating for a period of time, the feces become carbonized feces after sufficient pyrolysis (referring to FIG. 5), and then the top plate of the pyrolysis furnace 5-5 is opened. The collection container 5-9 is lifted through the sliding rods 5-25. Under gravity, the solid heat media 5-2 fall into the pyrolysis furnace 5-5 from the meshes of the collection container 5-9. When the collection container 5-9 is moved out of the pyrolysis furnace 5-5, the top plate 5-6 of the pyrolysis furnace is closed, and the feeding door 5-4 is opened. Under the action of the second electric push rod 5-22, the solid heat media 5-2 in the pyrolysis furnace 5-5 are pushed into the solid heat media storage box by the second push plate 5-8, and then the feeding door 5-4 is closed. The push rod of the pyrolysis furnace 5-5 is retracted to its original position. When the collection container 5-9 is lifted to a designated position (the designated position refers to the position where the axis of the collection container 5-9 is coaxial with the second push plate 5-12, referring to FIG. 6), under the action of the first electric push rod 5-18, the carbonized feces are pushed into the second storage box 5-10 by the first push plate 5-12 (referring to FIG. 7), and then the push rod for collecting the carbonized feces is retracted to its original position (referring to FIG. 8). The lower removable insulation layer at the bottom of the feces collection and treatment device 5 is removed, so that waste heat in the feces collection and treatment device 5 can be recovered by means of the liquid heat media in the heat recovery device 6, and the feces treatment process is completed.

After the user sitting on the closestool presses the fecal treatment start button to perform a feces treatment function, the anal cleaning start button can be pressed to flush anal opening of the user. The anal cleaning water falls on a surface of an upper cover plate of the feces collection and treatment device 5, flows into the anal cleaning water collection chamber 17 of the baffle plate 15 through the second liquid inlet hole 19 under gravity, and then is discharged into the municipal pipe network through the anal cleaning water discharge pipe 12 and sent to a municipal sewage treatment plant for treatment. Furthermore, through the second check valve 14 on the anal cleaning water discharge pipe 12, the anal cleaning water is discharged in one direction under gravity, and the odor in the pipe cannot flow back into the closestool.

When the user sitting on the closestool excretes urine, the urine treatment start button is pressed, and the urine flushing device 10 sprays the anal cleaning water to wash the urine. Under gravity, the mixture of the urine and the flushing water flows into the urine collection chamber 16 through the first liquid inlet holes 18, and is discharged into the urine evaporation box 8 through the urine collection pipe 11 for evaporation treatment. In addition, the first check valve 13 on the urine collection pipe 11 can prevent the odor from overflowing in the process of urine collection and evaporation.

The start and stop of the evaporation process in the urine evaporation box 8 are controlled by the sensor inside the dehumidifier 7. When humidity of the gas in the urine evaporation box 8 is higher than saturated vapor pressure, the dehumidifier 7 is started to evaporate the urine and the anal cleaning water entering the urine evaporation box 8.

During the evaporation process, the heat recovery device 6 heats the urine evaporation box 8 through the heat conduction between the liquid heat media and the base plate at the bottom of the heat recovery device 6. When the humidity of the gas in the urine evaporation box 8 is lower than saturated vapor pressure, the dehumidifier 7 stops working.

In this embodiment, by using the technical solutions of the structure of the device and the using method of the device, feces and urine can be effectively treated on site. Furthermore, carbonized feces and urine crystals which can realize resource utilization are produced. Compared with the traditional feces and urine treatment mode of flushing in closestool, collecting by sewage pipe network, and centralized treatment in sewage treatment plants, the treatment cost is reduced, the carbon sequestration of organic waste is realized, the carbon emission is reduced, the phosphorus resources in sewage are recovered, and the water resources are saved by reducing flushing water. The economic benefits, ecological benefits and social benefits are obvious.

In the description of the present disclosure, it needs to be illustrated that the indicative direction or position relations of the terms such as "center", "top", "bottom", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first" and "second" are just used for distinguishing the description, but cannot be understood to indicate or hint relative importance.

Specific examples are used for illustration of the principles and implementations of the present disclosure. The description of the above-mentioned embodiments is used to help illustrate the method and its core principles of the present disclosure. In addition, those skilled in the art can make various modifications to the specific embodiments and scope of application in accordance with the teachings of the present disclosure. In summary, the contents of this specification should not be understood as the limitation of the present disclosure.

What is claimed is:

1. A closestool with classification, collection and treatment functions, comprising:
   a closestool body;
   an anal flushing device arranged inside the closestool body, a retractable water spray pipe being provided as the anal flushing device;
   a feces collection and treatment device comprising a first storage box, a combined box and a second storage box, the first storage box being fixedly connected with a side of the combined box, and the second storage box being fixedly connected with another side of the combined box; the combined box comprising a lifting mechanism, a collection container, a feces pushing mechanism, a media pushing mechanism, a pyrolysis furnace, and a transfer box arranged above the pyrolysis furnace, the transfer box being located directly below a feces outlet of the closestool body, a top plate of the pyrolysis furnace being provided as a base plate of the transfer box, the top plate of the pyrolysis furnace and a top plate of the transfer box being both capable of opening and closing, and the lifting mechanism being configured for driving the collection container to lift and lower in the pyrolysis furnace and the transfer box; the feces pushing mechanism comprising a first electric push rod and a first push plate, the first electric push rod being fixedly connected with an inner wall of the transfer box, a passage port being arranged between the transfer box and the second storage box, and the first electric push rod being configured for driving the first push rod to be in sliding fit with an inner wall of the collection container to push feces in the collection container into the second storage box through the passage port; the first storage box being configured for storing solid heat media, a feeding port being formed in a top of the first storage box, a feeding door being arranged at a bottom of the first storage box, the feeding door being located between the first storage box and the pyrolysis furnace, and a first motor being configured for controlling opening and closing of the feeding door; the media pushing mechanism comprising a second electric push rod and a second push plate, the second electric push rod being fixedly connected with the inner wall of the transfer box, and the second electric push rod being configured for driving the second push plate to be in sliding fit with an inner wall of the pyrolysis furnace to push the solid heat media in the pyrolysis furnace into the first storage box through the feeding door;
   a heat recovery box, a top end of the heat recovery box being fixedly connected with a bottom end of the pyrolysis furnace, and a base plate of the pyrolysis furnace being provided as a top plate of the heat recovery box;
   a urine flushing device, the urine flushing device comprising a flushing pipe arranged at an upper side edge of an inner wall of the closestool body;
   a closestool cover plate, the closestool cover plate being installed on a top of the closestool body; and
   a control panel, an accommodating chamber corresponding to the control panel being formed in the closestool cover plate, the control panel being in sliding fit with the accommodating chamber, and switches for starting or stopping the lifting mechanism, the first electric push rod, the second electric push rod, the first motor, the water spray pipe and the flushing pipe and a controller being arranged in the control panel.

2. The closestool with classification, collection and treatment functions according to claim 1, wherein an arc-shaped screen is provided as the collection container, an axis of the arc-shaped screen is horizontal and parallel to an axis of the first push plate, the arc-shaped screen is coaxial with the first push plate and has an upward concave surface, and a diameter of meshes of the arc-shaped screen is 0.5 cm-1.0 cm.

3. The closestool with classification, collection and treatment functions according to claim 1, wherein the solid heat media include one or more of sand, kaolin, quartz sand, stone powder, yellow soil and red soil, and a particle size of the solid heat media is less than 0.5 cm.

4. The closestool with classification, collection and treatment functions according to claim 1, wherein a heating element is arranged on an inner side wall of the base plate of the pyrolysis furnace, the base plate of the pyrolysis furnace is made of stainless steel, a removable insulation layer is further arranged below the base plate of the pyrolysis furnace, the removable insulation layer is attached to an outer side wall of the base plate of the pyrolysis furnace when installed, and the removable insulation layer is partially immersed in liquid heat media in the heat recovery box when removed; and the liquid heat media include one or more of water, ethylene glycol and heat conduction oil.

5. The closestool with classification, collection and treatment functions according to claim 1, further comprising a liquid collection device, wherein the liquid collection device comprises a baffle plate, a urine collection pipe, a urine evaporation box, and an anal cleaning water discharge pipe;
   wherein the baffle plate is arranged in the closestool body and divides a pool of the closestool body into a urine pool and a feces pool, a urine collection chamber adjacent to the urine pool and an anal cleaning water collection chamber adjacent to the feces pool are formed in the baffle plate, the urine collection chamber is in communication with a bottom of the urine pool through several first liquid inlet holes formed in the baffle plate, and the anal cleaning water collection chamber is in communication with a bottom of the feces pool through several second liquid inlet holes formed in the baffle plate;
   wherein an evaporation drying agent and a dehumidifier are arranged inside the urine evaporation box, water-absorbing resin is provided as the evaporation drying agent, the dehumidifier is configured for dehumidifying gas inside the urine evaporation box, and a condensed water outlet of the dehumidifier is in communication with a municipal sewage pipe network; a liquid outlet at a bottom of the urine collection chamber is in communication with the urine evaporation box through the urine collection pipe, and a liquid outlet at a bottom of the anal cleaning water collection chamber is in communication with the municipal sewage pipe network through the anal cleaning water discharge pipe.

6. The closestool with classification, collection and treatment functions according to claim 1, wherein circumferential outer side walls of the urine evaporation box, circumferential outer side walls of the heat recovery box, side walls of the transfer box, the top plate of the transfer box, the top plate of the pyrolysis furnace, side walls of the pyrolysis furnace, side walls of the first storage box, side walls of the second storage box, and the feeding door are all made of heat insulation boards.

7. The closestool with classification, collection and treatment functions according to claim 6, wherein the heat insulation boards each comprise two stainless steel plates and a polyurethane foam plastic layer sandwiched between the two stainless steel plates.

8. The closestool with classification, collection and treatment functions according to claim 1, wherein the lifting mechanism comprises a second motor and a plurality of sliding rods parallel to each other, the sliding rods are vertically arranged and fixedly connected with the inner wall of the transfer box, and the collection container is slidably sleeved on all the sliding rods; a linear motor is provided as the second motor, the second motor is fixedly connected with the inner wall of the transfer box, and an output end of the second motor is fixedly connected with the collection container.

9. The closestool with classification, collection and treatment functions according to claim 1, wherein a media feeding mechanism is arranged inside the first storage box, the media feeding mechanism comprises a third electric push rod and a third push plate, the third electric push rod is fixedly connected with a top end of the first storage box, and the third electric push rod is configured for driving the third push plate to be in sliding fit with an inner wall of the first storage box to push the solid heat media in the first storage box into the pyrolysis furnace through the feeding door.

10. The closestool with classification, collection and treatment functions according to claim 5, further comprising an exhaust pipe, wherein the urine evaporation box, the transfer box and the pyrolysis furnace are all in communication with a first end of the exhaust pipe, a second end of the exhaust pipe is arranged outdoors, and the second end of the exhaust pipe is configured for exhausting.

\* \* \* \* \*